United States Patent
Paoli et al.

(10) Patent No.: US 7,269,360 B2
(45) Date of Patent: Sep. 11, 2007

(54) HIGH DYNAMIC RECEIVER FOR FREE SPACE OPTICS APPLICATION

(75) Inventors: Giovanni Paoli, Merate (IT); Gianfranco Verbana, Vinieicale (IT)

(73) Assignee: Alcatel, Paris (FR)

(*) Notice: Subject to any disclaimer, the term of this patent is extended or adjusted under 35 U.S.C. 154(b) by 655 days.

(21) Appl. No.: 10/695,764

(22) Filed: Oct. 30, 2003

(65) Prior Publication Data

US 2004/0086283 A1 May 6, 2004

(30) Foreign Application Priority Data

Oct. 31, 2002 (EP) .................................. 02292721

(51) Int. Cl.
*H04B 10/06* (2006.01)
(52) U.S. Cl. .................................... 398/212; 250/208.5
(58) Field of Classification Search ................ 398/118, 398/128, 129, 212–213; 250/208.2, 214 AG, 250/214 B, 214 C, 214 AL, 208.5
See application file for complete search history.

(56) References Cited

U.S. PATENT DOCUMENTS

| | | | | |
|---|---|---|---|---|
| 4,380,814 A | * | 4/1983 | Shinmyo | ..................... 375/267 |
| 4,451,916 A | * | 5/1984 | Casper et al. | ................... 714/4 |
| 5,491,548 A | * | 2/1996 | Bell et al. | ................... 356/73.1 |
| 5,825,821 A | * | 10/1998 | Okuyama | ..................... 375/260 |
| 6,657,714 B2 | * | 12/2003 | Almogy et al. | ........... 356/237.3 |

FOREIGN PATENT DOCUMENTS

| | | |
|---|---|---|
| EP | 0 398 038 A2 | 11/1990 |
| EP | 1 091 496 A2 | 4/2001 |
| WO | WO99/12286 | 3/1999 |

* cited by examiner

*Primary Examiner*—Leslie Pascal
(74) *Attorney, Agent, or Firm*—Sughrue Mion, Pllc.

(57) ABSTRACT

A receiver for an optics telecommunication system, the receiver comprises a first receiving device and means for focusing a received light beam carrying a signal towards such first receiving device. The receiver is characterized in that it further comprises at least a second receiving device and a beam splitter for splitting the focused light beam partially towards the first receiving device and partially towards the at least second receiving device. Tipically, the first receiver device is an APD diode while the second receiver device is a PIN diode. The telecommunication system is a Free Space Optics telecommunication system. A method is also described. The invention results in a high dynamic receiver. The dynamic of the invention receiver could be up to the sum of the dynamics of receivers provided with single receiving device (APD or PIN).

19 Claims, 3 Drawing Sheets

HIGH DYNAMIC RECEIVER FOR FREE SPACE OPTICS APPLICATION

The present invention pertains generally to electronic communications systems. More specifically, the present invention pertains to communication systems which transmit and receive information signals that are carried by analog or digital modulation of laser light beams, including the case of multiple wavelength transmission (DWDM). Still more in particular, the present invention relates to a high dynamic receiver to be used in a bi-directional free space optics system and a corresponding method.

The free space optics (briefly, FSO) telecommunication systems are known for transmitting a light signal through the air. The operation of such optical systems transmitting a modulated light signal is basically based on one or more lasers coupled to one or more lens (transmission side) and one or more lens for focusing the received laser beam on the detecting area of the receiver (receiver side).

In free space optical communication systems changes of propagation losses occur over a very wide range (e.g. from 0.2 dB/km with clear sky up to 300 dB/km with heavy fog). For this reason, when high availability of communication is requested, FSO links are often to be limited at very short hop to obtain the maximum value of the fade margin.

In principle, the above depicted situation is very similar to the one which is experienced with conventional radio link receivers. Unfortunately, the required fade margin in FSO receivers is even wider and at the same time the dynamic of optical devices received level is more limited than that one of radio receivers.

Moreover, in optical wireless systems, it could be rather difficult to solve the problem of controlling the power budget of a link by means of a conventional Automatic Transmission Power Control (ATPC) acting on the optical transmitted power.

Thus, the technical problem to be solved is providing an high dynamic optical receiver for FSO communications.

JP2000041005 by Nippon Telecom provides a solution to the above problem. The automatic regulation of the received signal to the photodiode is provided by means of a variable stop, exactly in the same way that is done in video or photo cameras.

While the Nippon Telecom solution is rather effective, it is clearly based on micromechanical devices. This constitutes a disadvantage as the use of micromechanical devices should be avoided, for reliability reasons, inside any equipment that shall operate in external environment.

A second prior art solution is based on the automatic change of polarization of the diode controlled by the input level. The main disadvantage of this solution is that the band characteristic is reduced. Furthermore, it can not be applied when the whole bandwidth is needed.

In view of the non fully satisfactory known solutions, the main object of the present invention is providing a high dynamic FSO receiver and method overcoming the drawbacks of the prior-art arrangements.

These and further objects are obtained by a FSO receiver according to independent claim 1 and a method according to claim 9. Further advantageous features of the present invention are set forth in the respective dependent claims. All the claims should be considered as an integral part of the present description.

The solution proposed in the present invention is based on the fact that PIN diodes operational range normally reaches higher (around +10 dB) saturation levels than APD that, on the opposite, it has a better sensitivity (the gain is about 10 dB, with same signal bandwidth).

Then, by realizing two receivers of the same signal, the first one using PIN diode and the second one using APD, and forwarding only one of the two demodulated signals with a proper logic it is possible to obtain a higher dynamic than any of the two receivers stand-alone.

The present invention will become fully clear after reviewing the following detailed description of an embodiment thereof, given by way of non limiting example, to be read with reference to the attached sheets of drawings wherein.

As said above, the present invention is based on the fact that PIN diodes operational range normally reaches higher (around +10 dB) saturation levels than Avalanche Photo Diodes. On the contrary, an APD has a better sensitivity (the gain is about 10 dB, with same signal bandwidth).

Starting from the above basic idea, the present invention provides for realizing two receiver devices of the same signal, the first one using PIN diode and the second one using an APD. By forwarding only one of the two demodulated signals with a proper logic it is possible to obtain a dynamic higher than any arrangement with one of the two receiver devices alone.

Figure 1:
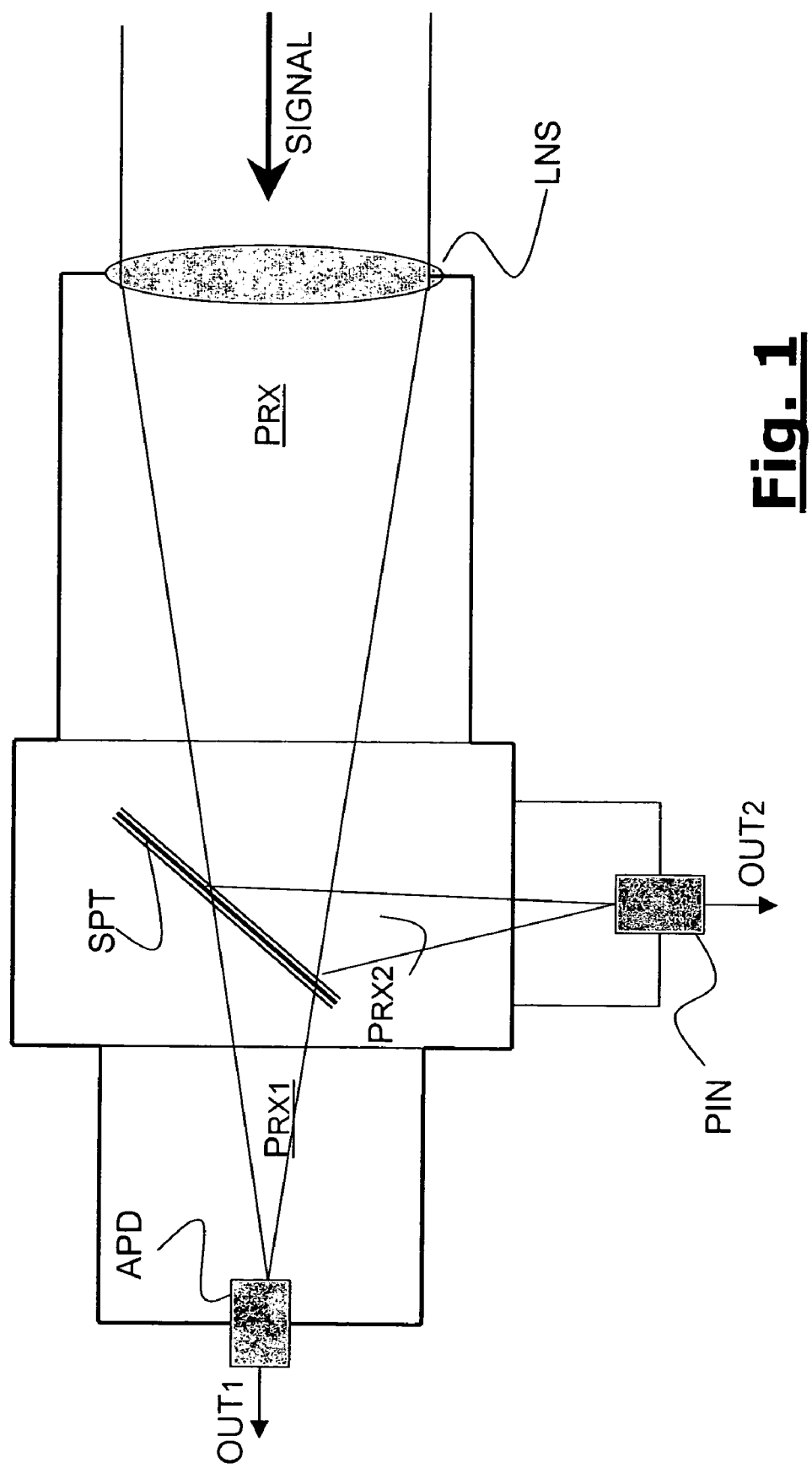
FIG. 1 shows an arrangement performing the power splitting according to a preferred embodiment of the present invention.

In FIG. 1 the main components of an exemplifying receiver for a FSO system according to the present invention is shown. According to the present invention, a laser beam carrying a signal is focused by a lens LNS. In turn, the converging beam is splitted into two portions PRX1, PRX2. One portion (PRX1) is provided to a first receiving device, typically an APD diode, and the further portion (PRX2) is sent to a second receiving device, typically a PIN diode.

Moreover, because in order to provide the same signal to two receivers a sort of power splitter SPT is needed, a further increase of dynamic can be obtained by using asymmetric splitting ratios.

In fact, by feeding the APD receiver device with the largest part of the receiver power the minimum losses on the signal are obtained, this results in maintaining the best sensitivity conditions. At the same time, by feeding the PIN diode with the minor part of the receiver power an additional attenuation of the signal is obtained, this will be given as improvement of the maximum tolerated received level.

While in FIG. 1 the receiver telescope function is shown as a single lens LNS for simplicity, it is evident that the same function can be obtained by any of the known optical arrangements (refractive, reflective or catadioptric).

In the arrangement of FIG. 1 (which is one of several possible arrangements providing the beam splitter feature), the splitting feature is provided through a beam splitter plate SPT. In other words, the converging beam encounters the splitter plate that, by means of a proper coating of its surfaces, allows the largest part of the signal (PRX1) to pass through and to continue to be focalized on the first receiving device, namely the APD diode.

At the same time the splitter plate reflects at 90° (this value is exemplifying and not limiting) the lesser part of the light carried signal (PRX2) to be focalized on the second receiving device, namely the PIN diode.

This asymmetric splitting ratio can be obtained in several further different ways without departing from the scope of the present invention. In particular, if the collecting telescope focalizes not directly on the receiving devices but on the input of an optical fibre, the splitting can be obtained with a hybrid on fibre technology.

Furthermore, an exemplifying possible distribution of power to the first or the second receiving devices could be: 85-98% of the received power is provided to the APD diode and the corresponding remaining portion (15-2%) is sent to the PIN diode. Preferably, 90% of the received power is sent to the APD and 10% to the PIN. It is stressed that the above ranges and these particular distribution figures are only exemplifying of all the possible solutions.

In principle, the theoric limit of dynamic is the sum of the dynamics of the APD and PIN diodes. In real arrangements, it is preferred to have a switch level area of some dBs (at least 1 or 2 dB).

Figure 2:
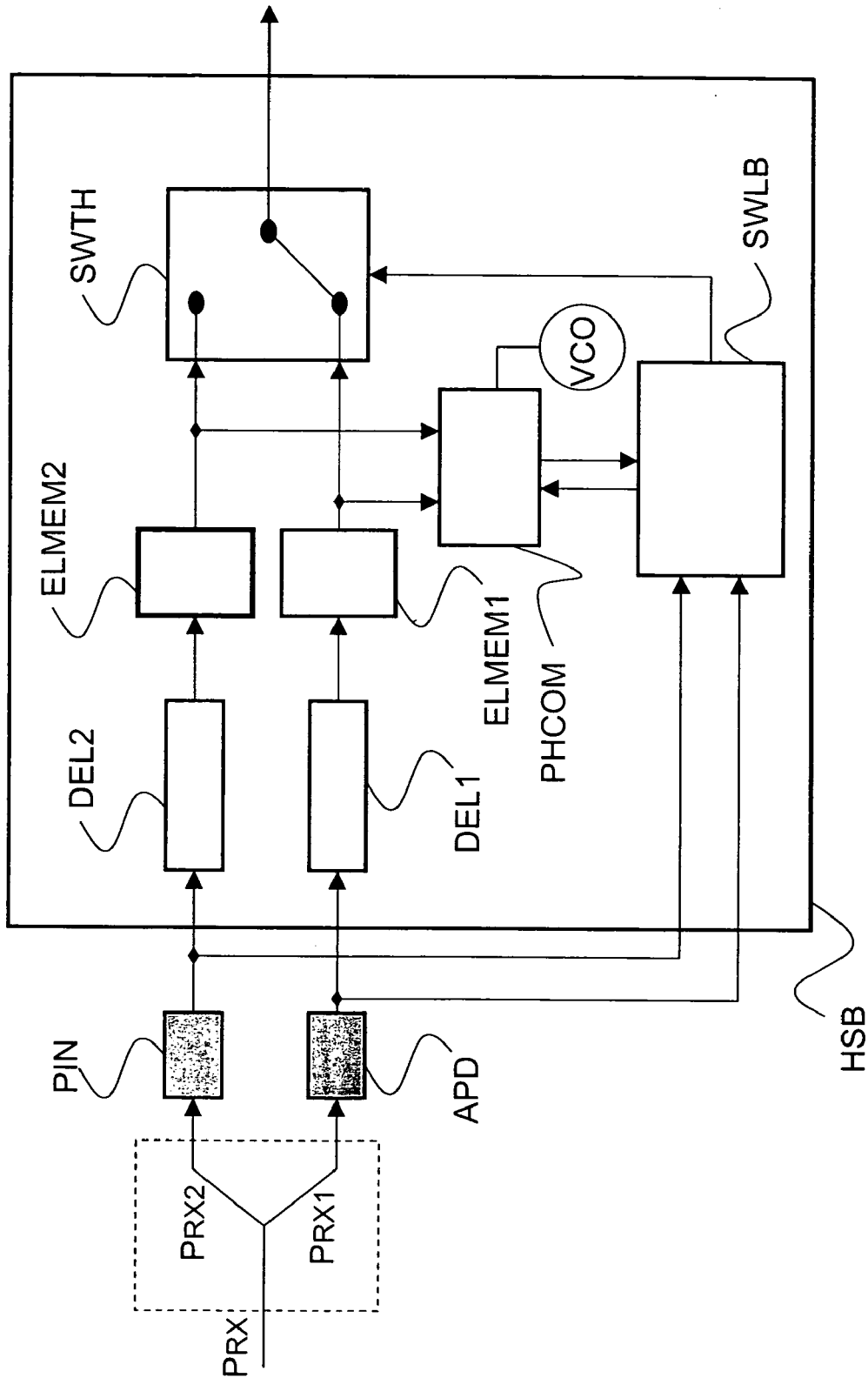
FIG. 2 shows a schematic block diagram of an high dynamic receiver according to the present invention.

FIG. 2 represents a preferred embodiment block diagram of the two receiver devices connected to a hitless switch block HSB that chooses one of the two demodulated signals on the basis of PRx indications (and possibly any other signal quality indications). The hitless switch block HSB is necessary in case of synchronous or plesiochronous digital transmission in order to avoid any loss of frames and error bursts during changeover. In FIG. 2, the beam splitter device is shown simply as a box with dotted lines.

The main function of the hitless switch block is to compensate the delay that the different receivers circuitry may introduce between the two, otherwise identical, demodulated signals.

For obtaining such a function, the hitless switch block HSB to be used with the present invention comprises: a first and a second delay lines DEL1, DEL2; corresponding first and second elastic memories ELMEM1, ELMEM2; a phase comparator PHCOM; a switch logic block SWLB; and a switch SWTH.

The output from the PIN receiver device and from the APD receiver device is sent to the respective delay lines DEL1, DEL2. After passing the respective delay lines, the delayed signals are sent to the corresponding elastic memories ELMEM1, ELMEM2. The outputs of the elastic memories are sent to the switch and to the phase comparator as well. In turn, the phase comparator is connected to a Voltage Controlled Oscillator (VCO) for phase re-alignment.

The output from the PIN receiver device and from the APD receiver device is sent also to the switch logic block. The switch logic block is bi-directionally connected to the phase comparator which operates according to the received power information (both from APD and PIN receiver devices). In other words, the switch logic block SLB provides information to the phase comparator PHCOM and also receives phase information from it. Finally, the output from the switch logic block is connected to the switch for driving it.

For analog or asynchronous transmission, the block diagram could be highly simplified as a pure switch and the switch logic (still working on PRx indications) because in this case providing a delay between the two signals is not important.

In order to describe the advantages obtained by the present invention, the following example (wherein the values should be considered as purely indicative and non limiting) is provided.

A FSO receiver based only on a PIN diode for a 155 Mbit/s signal could have a sensitivity of −35 dBm, a maximum working level of −5 dBm and a 30 dB of dynamic range. A FSO receiver based only on an APD diode for a 155 Mbit/s signal could have a sensitivity of −45 dBm, a maximum working level of 15 dBm and a 30 dB of dynamic range.

Now, we suppose that a combination of the two receivers is provided according to the present invention, as for instance in FIG. 1. Let's suppose to use an asymmetric beam-splitter which transmits to the APD receiver device the 90% of the received power (P1=PRx−0.5 dB) and splits to the PIN diode receiver device the 10% of the received power (P2=PRx−10 dB).

With this scheme, if the received power is in the range from +5 dBm to −25 dBm, the PIN receiver device can demodulate correctly; if the received power is in the range from −15 dBm to −45 dBm, the APD receiver device can demodulate correctly.

Figure 3:
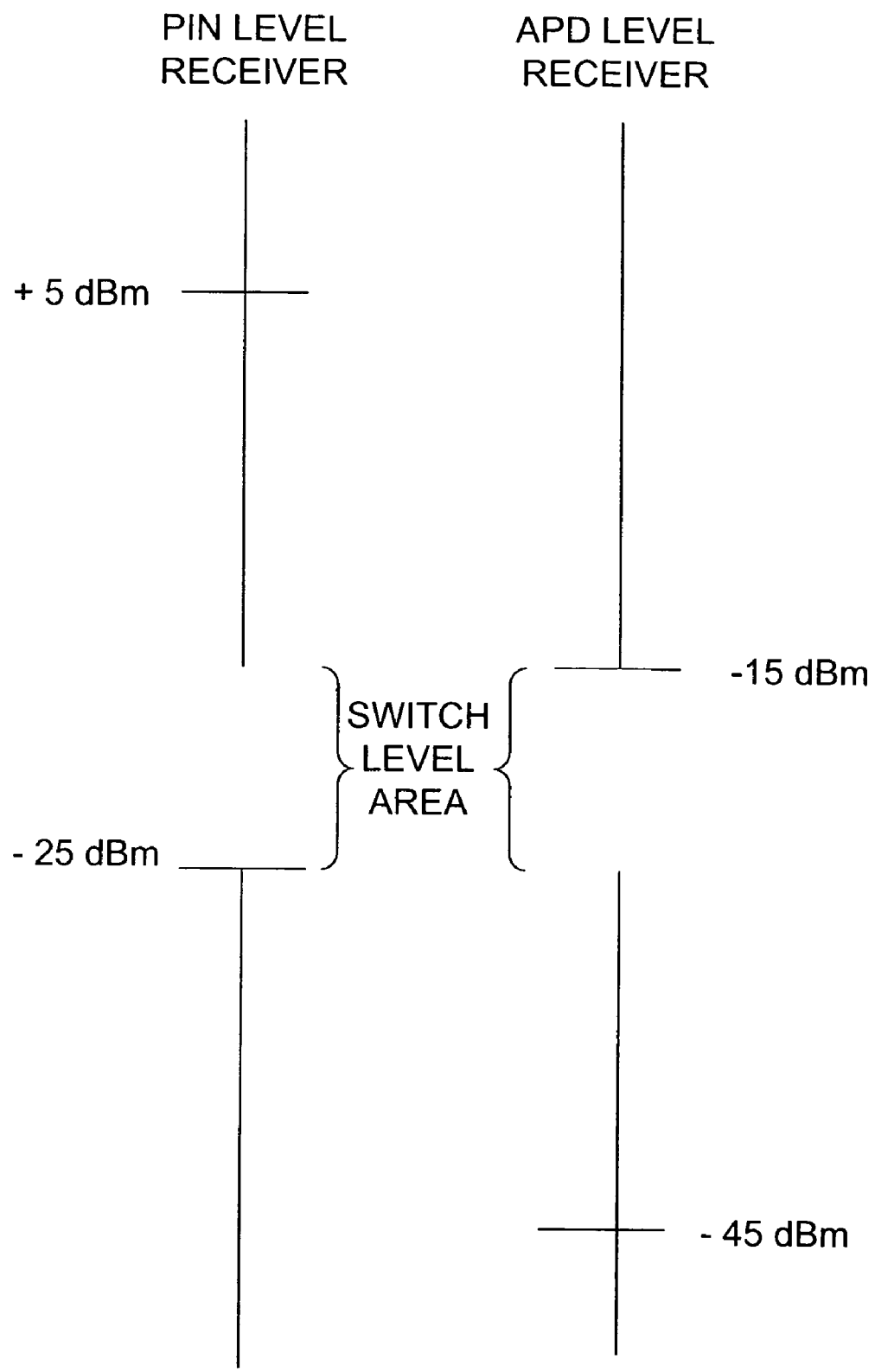
FIG. 3 shows an esemplifying comparison between PIN level receiver and APD level receiver with a switch level area.

With the values given in the example above, a man skilled in the art can understand that the present invention allows to reach a dynamic range of 50 dB to be compared with the 30 dB of the basic device stand-alone. Furthermore, an overlapping area of about 10 dB where the switch decision is taken (see level diagram in FIG. 3). It is stressed that the values of FIG. 3 are for a very specific embodiment (both APD and PIND diodes having a dynamic of 30 dB, a splitting ratio of 90% and 10%). Different values could be obtained for diodes having different characteristics and/or for different splitting ratios).

As, generally, changes of link attenuation caused by atmospheric events are rather slow and that the above overlap may be reasonably reduced, consequently the dynamic can be further improved. As a teoric limit, with a switch level area of 0 dB, the dynamic can be (in the example shown and described herewith) 60 dB, namely the sum of both the dymanics.

The above example can be easily extended to all kinds of carried signals, because, by changing the received signal, the absolute values of saturation and sensitivity both of PIN diodes and APDs will be translated roughly of the same amount and consequently the dynamic range will be maintained the same.

Thus, summarizing, the present invention provides a receiver and a method implementing improved dynamic receiving features for a bi-directional free space optical communications system through atmosphere. In an advantageous embodiment of the invention, the method comprises implementing an optical receiver combining the use of a PIN diode and an APD. A PIN diode normally supports higher received levels than APD; in turn, an APD has a better sensitivity. When the received signal is at high level, the demodulated signal is taken from the PIN diode; on the contrary, when it is at a low level, it is taken from the APD.

Finally, while the present invention is particularly useful for establishing a laser terrestrial communication link which compensates for the high variation of link attenuation due to the atmosphere impairment as fog and rain, it could be profitably used for satellite applications, point-to-multipoint radio transmissions, optical fiber links, . . .

There have thus been shown and described a novel receiver and a novel method which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the scope of the invention are deemed to be covered by the invention which is limited only by the claims which follow.

The invention claimed is:

1. A receiver for receiving a light beam carrying a signal in a free space optics telecommunication system, the receiver comprising:
    a first receiving device having a first saturation level and a first sensitivity;
    a second receiving device having a second saturation level and a second sensitivity;
    means for focusing said received light beam;
    a beam splitter for splitting the focused light beam into a first portion towards the first receiving device and into a second portion towards the second receiving device; and
    a switch for switching between the first receiving device and the second receiving device according to a level of said signal.

2. The receiver according to claim 1, characterized in that the beam splitter provides an asymmetric ratio in order to send different portions of the received signal power to the first and to the at least second receiving device.

3. The receiver according to claim 2, characterized in that the largest portion of the received signal is provided to the first receiving device.

4. The receiver according to claim 3, characterized in that the portion of the received signal which is provided to the first receiving device is between 85-98%, of the whole received power.

5. The receiver according to claim 3, wherein the portion of the received signal which is provided to the first receiving device is approximately 90% of the whole received power.

6. The receiver according to claim 1, wherein said second saturation level is higher than said first saturation level.

7. The receiver according to claim 1, further comprising a hitless switch block in turn comprising a switch logic block responsive to input power information from the first and the at least second receiving devices and to phase information from a phase comparator, the switch logic block driving said switch selecting a signal between the signal from the first receiving device and the signal from the at least second receiving device.

8. The receiver according to claim 1, wherein said first sensitivity is higher than said second sensitivity.

9. The receiver according to claim 1, characterized in that the first receiver device comprises an APD diode.

10. The receiver according to claim 1, characterized in that the at least second receiver device comprises a PIN diode.

11. A method for providing high dynamic range in a receiver, the receiver comprising receiver for receiving a light beam carrying a signal in a free space optics telecommunication system, the receiver comprising a first receiving device having a first saturation level and a first sensitivity, the method comprising the steps of:
    providing a second receiving device having a second saturation level and a second sensitivity;
    focusing said received light beam;
    splitting the focused light beam into a first portion towards the first receiving device and into a second portion towards the second receiving device; and
    switching between the first receiving device and the second receiving device according to a level of said signal.

12. The method according to claim 11, characterized in that the step of beam splitting comprises providing the largest portion of the received signal to the first receiving device.

13. The method according to claim 12, characterized in that the portion of the received signal which is provided to the first receiving device is between 85-98%, of the whole received power.

14. The method according to claim 12, wherein the portion of the received signal which is provided to the first receiving device is approximately 90% of the whole received power.

15. The method according to claim 11, characterized in that the step of beam splitting comprises the step of beam splitting according to an asymmetric ratio in order to send different portions of the received signal power to the first and to the at least second receiving device.

16. The method according to claim 11, characterized in that the first receiver device comprises an APD diode and at least one second receiver device comprises a PiN diode.

17. The receiver according to claim 11, wherein said second saturation level is higher than said first saturation level.

18. The receiver according to claim 11, wherein said first sensitivity is higher than said second sensitivity.

19. The method according to claim 11, wherein said switching step comprises selecting a signal between the signal from the first receiving device and the signal from the at least one second receiving device according to phase information from a phase comparator and according to signal received power information.

* * * * *